US005435519A

United States Patent [19]

Everingham

[11] Patent Number: 5,435,519

[45] Date of Patent: Jul. 25, 1995

[54] EGR SYSTEM HAVING FAST-ACTING EGR VALVE

[75] Inventor: Gary M. Everingham, Chatham, Canada

[73] Assignee: Stemens Electric Limited, Chatham, Canada

[21] Appl. No.: 221,205

[22] Filed: Mar. 31, 1994

[51] Int. Cl.[6] ........................ F02M 25/07; F16K 31/06

[52] U.S. Cl. ........................ 251/129.15

[58] Field of Search .................... 123/571; 251/129.15; 335/219, 220, 255, 278, 279, 281

[56] References Cited

U.S. PATENT DOCUMENTS

| | | | |
|---|---|---|---|
| 4,518,938 | 5/1985 | Bartholomaus et al. | 335/255 |
| 5,056,556 | 10/1991 | Nishimoto et al. | 251/129.15 |
| 5,144,272 | 9/1992 | Nishimura | 335/255 |
| 5,217,200 | 6/1993 | Hutchings et al. | 251/129.15 |
| 5,218,999 | 6/1993 | Tanimoto | 251/129.15 |
| 5,302,930 | 4/1994 | Brehm et al. | 335/255 |
| 5,307,991 | 5/1994 | Hanson et al. | 251/129.15 |
| 5,328,151 | 7/1994 | Hashida | 251/129.15 |
| 5,346,176 | 9/1994 | Fujimoto et al. | 251/129.15 |

*Primary Examiner*—Willis R. Wolfe

*Attorney, Agent, or Firm*—Russel C. Wells

[57] ABSTRACT

The magnetic circuit has an air gap on the interior of the bobbin-mounted coil. A non-ferromagnetic cylindrical sleeve lines the interior of the coil. The armature is disposed within the sleeve and has a cylindrical wall with an axial taper proximate the air gap. The sleeve extends to seal against a bushing that guides a portion of the valve member between the solenoid and the valve head so that any exhaust gases that infiltrate through the bushing to the solenoid are confined within the sleeve.

11 Claims, 2 Drawing Sheets

EGR SYSTEM HAVING FAST-ACTING EGR VALVE

FIELD OF THE INVENTION

This invention relates to exhaust gas recirculation (EGR) systems of internal combustion engines and in particular to a fast-acting solenoid-operated EGR valve.

BACKGROUND AND SUMMARY OF THE INVENTION

For control of certain tailpipe emissions, contemporary internal combustion engines of automotive vehicles use EGR to dope the fresh fuel-air charge. The amount of EGR is controlled by an EGR valve which is itself controlled by the engine control strategy. For certain control strategies, vacuum actuation is sufficient to operate an EGR valve. For others, vacuum control may not be sufficiently responsive. Solenoid-operated EGR valves offer the potential for faster response.

The present invention relates to an EGR system having an improved EGR valve characterized by faster response. The improvements reside principally in constructional features of the solenoid, especially the stator and the armature, and in the association of the solenoid with the valve mechanism. Such features, plus other advantages and benefits of the invention, will be seen in the ensuing description and claims which are accompanied by drawings. The drawings disclose a preferred embodiment of the invention according to the best mode contemplated at this time for carrying out the invention.

DESCRIPTION OF THE PREFERRED EMBODIMENT

Figure 1:
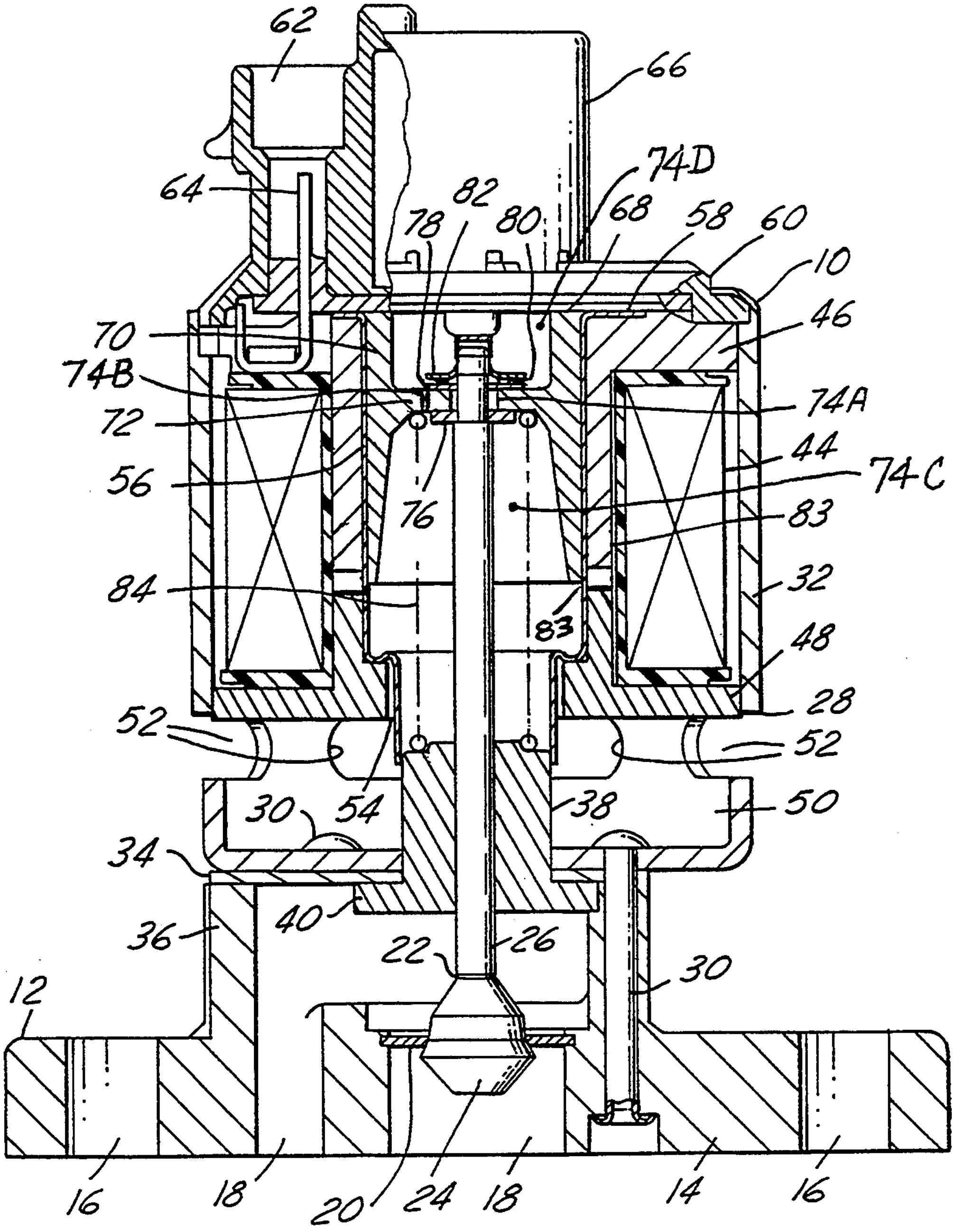
FIG. 1 is a longitudinal cross-sectional view through an EGR valve embodying principles of the invention.
Figure 2:
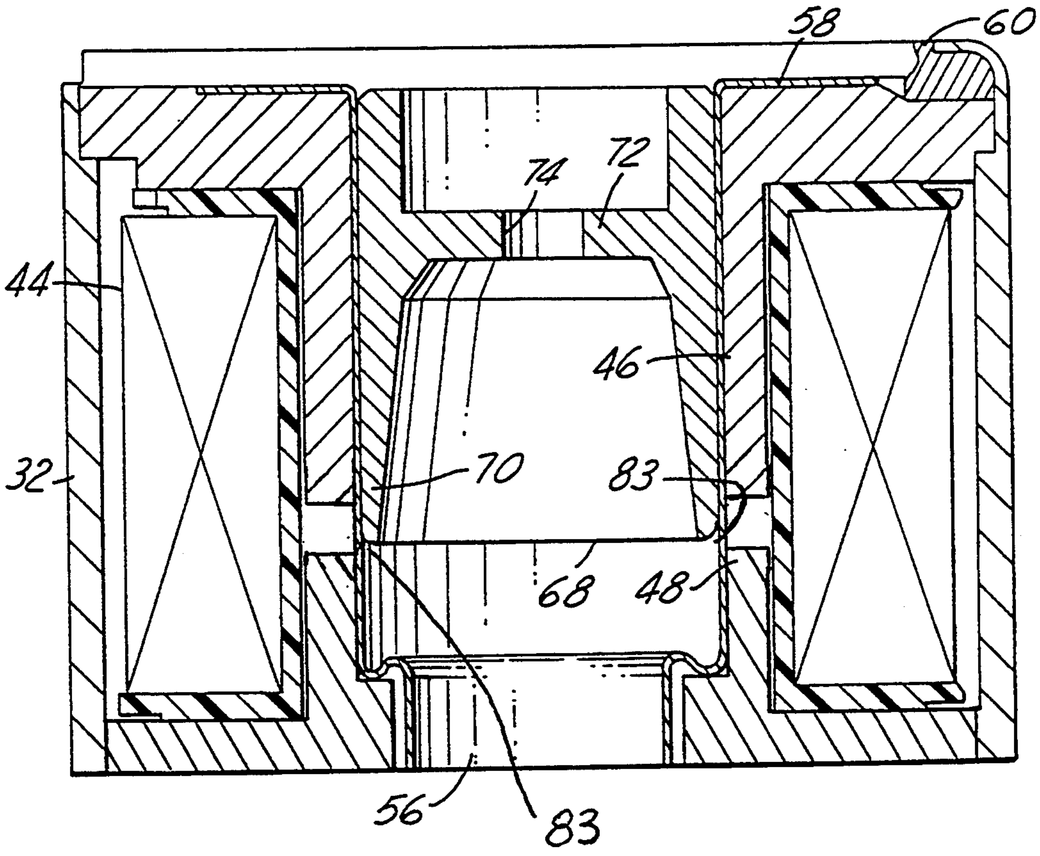
FIG. 2 is an enlarged view of a portion of the solenoid by itself, apart from the valve.

An EGR valve 10 comprises a base 12 that includes a mounting flange 14 for mounting the valve on an engine (not shown) by means of fasteners (not shown) that pass through holes 16 in flange 14. Valve 10 controls flow through a passage 18 having an inlet and an outlet located in a central region of the face of flange 14 that is toward the engine. An annular seat member 20 is disposed in and transversely across passage 18 and secured to the passage wall in a sealed manner. A valve member 22 having a head 24 and a stem 26 is associated with seat member 20 to open and close passage 18. FIG. 1 shows the closed position.

Valve member 22 is operatively coupled with a solenoid 28 that is disposed atop of and held securely against base 12 by fasteners 30. Solenoid 28 comprises a ferromagnetic casing 32, and a gasket 34 is disposed between the bottom end wall of this casing and the open top of a central riser 36 of base 12. Gasket 34 serves to seal the closure of casing 32 around the outer perimeter of the open top of riser 36, but both gasket and casing are centrally apertured to accommodate the mounting of a bushing 38 that guides the motion of valve member 32 by having a close fit with stem 26. The cylindrical body of bushing 38 passes through the central apertures in the gasket and solenoid casing while a flange 40 at the bushing's lower end seats on a ledge just inside the open top of riser 36. Gasket 34 provides sealing at this location too.

Solenoid 28 comprises a bobbin-mounted coil 44 and two ferromagnetic pole pieces 46, 48 disposed within casing 32, but spaced above the casing's lower end wall. Thus, below lower pole piece 48, the casing's interior comprises a vacant space 50 which is vented to the exterior by means of through-slots 52 in the casing's side wall. The lower pole piece 48 is spaced slightly above the upper end of bushing 38 and comprises a hole 54 that is slightly larger in diameter than the body of bushing 38. A non-ferromagnetic sleeve 56 lines the I.D. of pole pieces 46, 48 and is necked down to allow it to pass through hole 50 and continue downwardly to telescope in sealed manner over the upper end of the body of bushing 38. The upper end of sleeve 52 is flanged at 58 for entrapment between the top of upper pole piece 46 and a cap 60 that forms a closure for the upper end of the solenoid. A region of cap 60 is shaped to provide a shell 62 for electrical terminals 64 connected with coil 44, thus forming an electrical connector for mating with a complementary connector (not shown) that leads to a source of control signals for controlling operation of valve 10, such as an engine management ECU. FIG. 1 also shows cap 60 to contain a transducer, or sensor, 66 that is used to provide to such an ECU feedback representing the extent to which the valve is open, but the incorporation of such a sensor into any particular valve embodying the invention is strictly optional.

The operative coupling of valve member 22 with solenoid 28 comprises a ferromagnetic armature 68 which comprises a generally cylindrical tubular side wall 70 transversely spanned by a transverse wall 72 that is spaced interiorly from opposite ends of side wall 70. Wall 72 contains a central through-hole 74A allowing through-passage of the distal end of stem 26 and a vent hole 74B so as to allow air movement from lower chamber 74C to upper chamber 74D and visa versa. The connection between stem 26 and wall 72 comprises at the lower face of wall 72, a washer 76 that is captured between the washer and a shoulder of stem 26, and at the upper face of wall 72, a washer 78, a spring 80, and a nut 82 in that order. Nut 82 is threaded onto the end of stem 26 with an interference fitting thread of mismatched pitch, and in the process forces wall 72 to be resiliently sandwiched between washers 76 and 78. The resiliency of the compression is due to spring 80, but is not so free as to allow any significant axial lost motion between stem 26 and wall 72. Rather, the nature of the connection is to hold the valve member and armature together so that they move axially in unison, while armature 68 is allowed slight radial displacement so that it can float radially to a limited extent to compensate for slight misalignments of parts that theoretically at least should be perfectly coaxial.

Pole pieces 46, 48 and the side wall of casing 32 form a magnetic circuit for the magnetic flux issued by coil 44 when energized. An air gap 83 is cooperatively defined by pole pieces 46, 48 where they confront each other on the interior of the bobbin-mounted coil. That portion of armature side wall 70 which is proximate air gap 83 is tapered for interaction with the air gap when the coil is energized. The axial taper of the cylindrical wall narrows in the direction in which the armature moves in response to increasing current flow in the coil generating increased magnetic flux at air gap 83. An increase in electric current flowing through coil 44 will cause magnetic flux to build in the magnetic circuit. At the air gap, this increasing flux will strive to draw an increasing amount of ferromagnetic material in the vicinity into the air gap, and because of the taper of side wall 70 proximate the air gap, a downward force will be exerted on armature 68. As the armature does move downward, it is resiliently resisted by increasing force created in a spring 84 that is being compressed between the armature and bushing 38. For a given magnitude of electric current flow in coil 44, armature 68 will assume a position where the opposing force of spring 84 balances the magnetic force, and this will therefore result in a corresponding positioning of valve member 22 and consequent corresponding unseating of head 24 from seat 20. The EGR valve is opened to an extent determined by the control signal supplied to it; the greater the current flow in coil 44, the greater the valve head is unseated from the valve seat. When the control signal delivers no current to the coil, spring 84 forces the valve head closed against the valve seat.

Because the EGR valve mounts directly on the engine and controls the conduction of hot exhaust gas, it is exposed to elevated temperatures. Space 50 provides a ventilated zone for thermally separating the bulk of the solenoid from the engine. Although valve stem 26 has a close sliding fit within bushing 38, any minor amounts of exhaust gas escaping upwardly through the bushing are contained by virtue of sleeve 56 and the closures of its opposite ends with parts of the EGR valve.

The constructional features that have been described provide an improved EGR valve characterized by fast, accurate, reliable response in the control of hot exhaust gases being recirculated from exhaust manifold to intake manifold of an engine.

While a presently preferred embodiment of the invention has been illustrated and described, it should be appreciated that principles are applicable to other embodiments.

What is claimed is:

1. In an exhaust gas recirculation (EGR) system of an internal combustion engine wherein an electrically-operated EGR valve controls the recirculation of exhaust gas from an exhaust manifold to an intake manifold for doping combustible air-fuel mixture, and said EGR valve comprises a solenoid having a coil, a stator, and an armature, and a valve member operatively coupled with said armature for controlling flow of exhaust gas through a passage of the valve, the improvement which comprises said stator comprising means defining an annular air gap between confronting magnetic pole pieces on the interior of the coil, and said armature comprises a cylindrical wall disposed on the interior of the coil, said cylindrical wall comprising an axial taper proximate said air gap.

2. In an exhaust gas recirculation (EGR) system of an internal combustion engine, the improvement as set forth in claim 1 characterized further in that said armature further comprises a transverse wall spanning the interior of said cylindrical wall and spaced axially from opposite axial ends of said cylindrical wall.

3. In an exhaust gas recirculation (EGR) system of an internal combustion engine, the improvement as set forth in claim 2 characterized further in that a non-ferromagnetic sleeve is disposed between said armature and said pole pieces in covering relation to said air gap.

4. In an exhaust gas recirculation (EGR) system of an internal combustion engine, the improvement as set forth in claim 3 characterized further in that one end of said sleeve is closed by a bushing that guides the motion imparted to said valve member by said armature.

5. In an exhaust gas recirculation (EGR) system of an internal combustion engine, the improvement as set forth in claim 4 characterized further in that an opposite end of said sleeve is closed by a cap so that any exhaust gas infiltrating through said bushing to said solenoid is confined within said sleeve.

6. In an exhaust gas recirculation (EGR) system of an internal combustion engine, the improvement as set forth in claim 2 characterized further in that said valve member comprises a stem and said stem is operatively coupled with said armature transverse wall by a connection that allows slight radial float of the armature on the stem without any significant axial lost-motion between them.

7. In an exhaust gas recirculation (EGR) system of an internal combustion engine, the improvement as set forth in claim 1 characterized further in that the taper of said cylindrical wall narrows in the direction in which said armature moves in response to increasing current flow in said coil generating increased magnetic flux at said air gap.

8. In an exhaust gas recirculation (EGR) system of an internal combustion engine, the improvement as set forth in claim 1 characterized further in that a non-ferromagnetic sleeve is disposed between said armature and said pole pieces in covering relation to said air gap.

9. In an exhaust gas recirculation (EGR) system of an internal combustion engine, the improvement as set forth in claim 8 characterized further in that one end of said sleeve is closed by a bushing that guides the motion imparted to said valve member by said armature.

10. In an exhaust gas recirculation (EGR) system of an internal combustion engine wherein an electrically-operated EGR valve controls the recirculation of exhaust gas from an exhaust manifold to an intake manifold, said EGR valve comprises a solenoid having a coil, a stator, and an armature, and a valve member operatively coupled with said armature for controlling flow of exhaust gas through a passage of the valve, the improvement which comprises said stator comprising means defining an annular air gap between confronting pole pieces on the interior of the coil, said armature comprising a cylindrical wall disposed on the interior of the coil proximate said air gap, and a non-ferromagnetic liner disposed between said armature and said stator in covering relation to said air gap and extending at one end to telescopic sealed fit with a bushing that guides the motion of said valve member by said armature.

11. In an exhaust gas recirculation (EGR) system of an internal combustion engine, the improvement as set forth in claim 10 characterized further in that an opposite end of said sleeve is closed by a cap so that any exhaust gas infiltrating through said bushing to said solenoid is confined within said sleeve.

* * * * *